H. E. SNYDER.
SKIRT MARKER.
APPLICATION FILED MAR. 9, 1912.
1,040,449.
Patented Oct. 8, 1912.
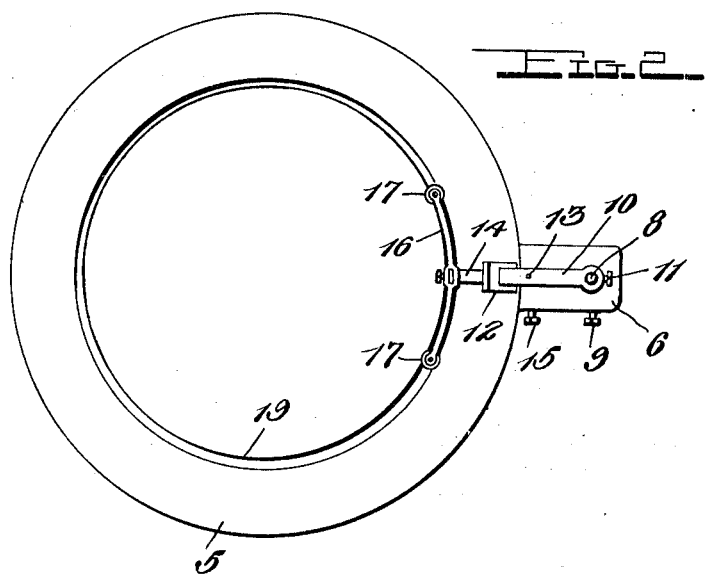
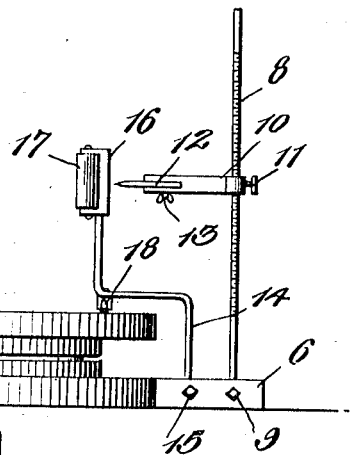
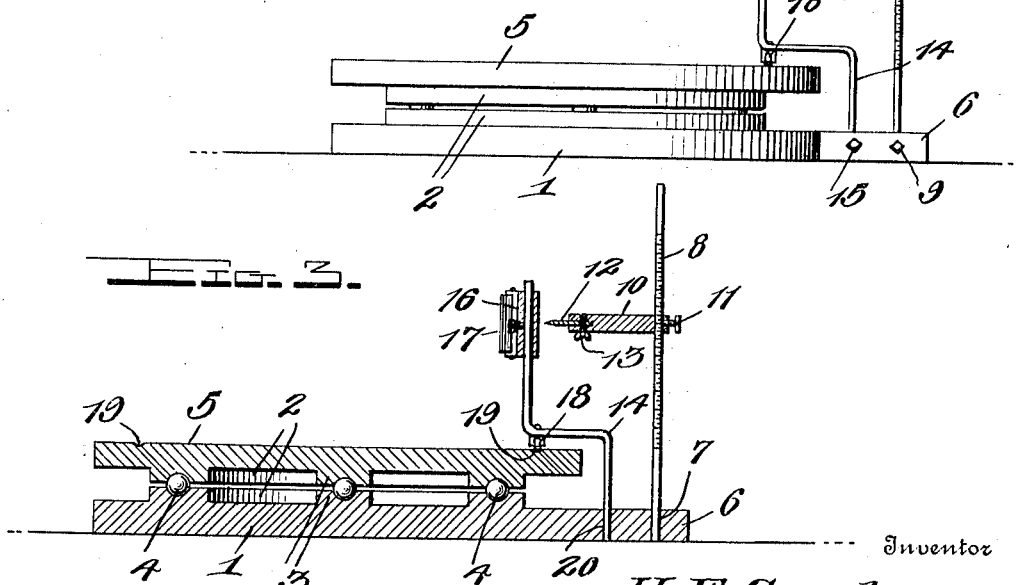
Witnesses
Chas. L. Griestauer.
A. B. Norton.
Inventor
H. E. Snyder,
By Watson E. Coleman.
Attorney

UNITED STATES PATENT OFFICE.

HENRY E. SNYDER, OF ELMIRA, NEW YORK.

SKIRT-MARKER.

1,040,449.    Specification of Letters Patent.    Patented Oct. 8, 1912.

Application filed March 9, 1912. Serial No. 682,630.

*To all whom it may concern:*

Be it known that I, HENRY E. SNYDER, a citizen of the United States, residing at Elmira, in the county of Chemung and State of New York, have invented certain new and useful Improvements in Skirt-Markers, of which the following is a specification, reference being had to the accompanying drawings.

This invention relates to new and useful improvements in skirt markers for tailors' and dress makers' use and my object is to provide a device of this character which may be readily, quickly and positively operated to indicate on a skirt, a predetermined distance from the ground.

A further object of the invention resides in providing a back ground for a marker which is capable of various adjustments and which is provided with rollers at the ends thereof over which the fabric of the skirt may readily pass without danger of being engaged therewith.

Still another object of the invention resides in providing a device which is extremely simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawing forming a part of this application, Figure 1 is a side elevation of the device. Fig. 2 is a top plan view thereof; and Fig. 3 is a vertical section through the device.

In describing my invention, I shall refer to the drawing in which similar reference characters designate corresponding parts throughout the several views and in which 1 indicates a base plate which may be mounted on the floor or upon a supporting member, as desired, said plate being preferably circular and provided with an annular grooved flange or the like 2 as well as a central grooved embossment 3, said grooved flange and embossment forming respectively an annular channel and central socket adapted to receive bearing balls 4 therein. An additional and top plate 5 of substantially the same diameter as the plate 1 has the under face thereof also provided with an annular grooved flange and central socket similar to the flange and socket 2 and 3 and when said plate 5 is placed over the plate 1, the bearing balls are adapted to also enter the socket and channel of the last mentioned plate to space the same from the plate 1 and at the same time permit the one to revolve on the other. The plates 1 and 5 form a substantial platform upon which one may stand in order to have the length of a skirt gaged and marked. The plate 1 is also provided with an extension 6 having an opening 7 in which is removably disposed a vertically extending rod 8, said rod being held in position in the extension 6 by means of a set screw 9 and slidably mounted on said rod 8 is a sleeve member or the like 10 which may be held in any desired position on the rod by means of a set screw 11 and which is adapted to hold chalk or other marking device 12 therein. The marking device is also adjustably held in the sleeve member 10 by means of a set screw 13.

It will be appreciated that it is only necessary for one desiring to have the length of a skirt marked, to step upon the upper plate 5 and the sleeve 10 may be moved upwardly or downwardly to register with the desired indication on said rod 8, the latter being graduated.

In order to form a back ground or bearing surface for the marking device 12, an angular rod 14 is adjustably mounted in the extension 6 of the plate 1 and held therein by means of a set screw 15, the upper end of said rod being adapted to be disposed beneath the skirt and having adjustably mounted on the upper free end thereof a bearing plate 16. This plate may be slightly curved if desired, and the ends of the same have mounted therein the rollers 17, whereby it will be seen that as the fabric of the skirt contacts therewith, no damage will occur thereto.

In order to form a substantial bracing member for the arm 14 when pressure is placed thereon by the marking of the garment, an additional swivel-roller 18 is mounted thereon and adapted to rest in an annular groove or channel 19 formed in the upper face of the plate 5.

From the foregoing it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to without departing from the spirit or sacrificing any of the novel features of the invention.

Having thus described this invention, what is claimed is:—

1. A device of the class described comprising a base plate, said base plate being provided with an extension thereon, an additional plate revolubly mounted on said base plate, a rod removably mounted in the extension of said base plate, a marking device adjustably mounted on said rod, an additional rod removably mounted in said extension, a backing plate adjustably mounted on said last mentioned rod, said backing plate having rollers mounted at the ends thereof, and supporting means for the last mentioned rod.

2. A device of the class described comprising a base plate having a lateral extension thereon, an additional plate revolubly mounted on said base plate, a vertical rod removably mounted in said extension, a marking device adjustably mounted on said rod, an angular rod removably mounted in said extension, a backing plate adjustably mounted on said angular rod, said backing plate being provided with rollers at the ends thereof, and an additional roller carried on said angular rod and contacting with the upper face of said additional plate to support said rod when pressure is placed thereagainst.

In testimony whereof I hereunto affix my signature in the presence of two witnesses.

HENRY E. SNYDER.

Witnesses:
CHARLES BROWN,
MICHAEL LEVINE.

Copies of this patent may be obtained for five cents each, by addressing the "Commissioner of Patents, Washington, D. C."